United States Patent [19]

Comerford

[11] Patent Number: 5,410,334
[45] Date of Patent: Apr. 25, 1995

[54] SWITCH FOR PEN-DOWN SENSING IN ELECTRONIC STYLI

[75] Inventor: Liam D. Comerford, Carmel, N.Y.

[73] Assignee: International Business Machines Corporation, Yorktown Heights, N.Y.

[21] Appl. No.: 584,816

[22] Filed: Sep. 19, 1990

[51] Int. Cl.⁶ .............................................. G08B 21/00
[52] U.S. Cl. ................................. 345/179; 178/18; 200/52 R
[58] Field of Search ............... 346/139 C; 178/18, 19; 340/706, 707, 708; 382/3, 13, 59; 33/559, 556, 561; 200/5 A, 6 A, 52 R, 56 R, 277, 277.1, 243, 250, DIG. 29; 345/179, 180, 182, 183, 184

[56] References Cited

U.S. PATENT DOCUMENTS

| | | | |
|---|---|---|---|
| 2,475,696 | 7/1949 | Cornish | 200/277.1 |
| 3,098,141 | 7/1963 | Wintriss | 200/277.1 |
| 3,835,453 | 10/1974 | Narayanan | 382/13 |
| 4,131,880 | 12/1978 | Siy et al. | 382/59 |
| 4,268,730 | 5/1981 | Higgins et al. | 178/18 |
| 4,288,925 | 9/1981 | McMurtry | 33/561 |
| 4,375,723 | 3/1983 | McMurtry | 33/559 |
| 4,532,376 | 7/1985 | Rockwell | 178/18 |
| 4,667,182 | 5/1987 | Murphy | 340/708 |
| 4,695,680 | 9/1987 | Kable | 178/19 |

*Primary Examiner*—Richard Hjerpe
*Assistant Examiner*—Steven J. Saras
*Attorney, Agent, or Firm*—Whitham, Curtis Whitham & McGinn; Robert Tassinari, Jr.

[57] ABSTRACT

A pen-down sense switch for electronic styli is based on three geometric principles. The first is that a regular convex surface contacts any other surface possessing a larger (or a relative negative) radius of curvature at a single point. The second principle is that rigid bodies may be translated (within limits) without changing their size or shape. The third is that given a plane with a constant radius of curvature, three points which can contact its surface will uniquely determine its position. Within the physical environment and subject to the forces which typically act on stylus switches, machined, solid metal components can be made to be a better than first-order approximation to ideal geometric objects.

5 Claims, 1 Drawing Sheet

SWITCH FOR PEN-DOWN SENSING IN ELECTRONIC STYLI

BACKGROUND OF THE INVENTION

1. Field of the Invention

The present invention generally relates to the field of handwriting interface devices for computing systems and, more particularly, to a switch for pen-down sensing in electronic styli.

2. Description of the Prior Art

The use of a stylus of some form for the creation of writing is as old as writing itself. The form of the stylus has been dictated by the writing medium. In modern times, the use of the highly refined skills involved in the use of writing instruments has been envisaged as a proper set of skills for use when communicating with a computing system. This is a natural outcome of the increased use of computing systems as a storage medium for documents, the even greater power of computing systems to perform actions that resemble human recognition, and the great flexibility that the stylus offers as an expressive tool. It should also be noted that for some written languages, such as those using Kanji characters, the stylus represents a far more acceptable tool for character entry than a keyboard.

The use of stylus input to computing systems has been used for such diverse applications as computer aided design (CAD), editing, spread sheet operation, signature recognition systems, and user interface operation. In each application, the stylus forms part of a "digitizer", the function of which is to convert stylus positions into computer-read numbers. Digitizers find their largest market in the area of CAD applications, so the requirements of the CAD applications have more or less determined the kind of switches used in digitizer styli.

In many CAD applications, the stylus is used in conjunction with a two-dimensional digitizing tablet to indicate a succession of static points the positions of which are recorded by the computer for further processing. Styli which have been built for CAD applications have switches incorporated in their structure to permit the user to indicate the to the computing system that the user is satisfied that the stylus is pointing to exactly the position that the user wishes to be recorded. The optimal switch for such use permits the user to make contact with the digitizer surface and even to apply substantial pressure to the stylus without actuating the switch. The very deliberateness which is a feature of these switches is a handicap in the area of handwriting capture.

When CAD oriented styli are used for handwriting data capture, it is not uncommon to find skips or other errors in the data stream. These are the consequence of the unaccustomed force and point travel required when such styli are used for writing. In the field of signature verification, considerable attention has been given to the development of styli which more closely simulate a writing pen so as to make the handwriting more natural, and hence the data input to the computer more accurate.

Recent developments in the field of automatic signature verification such as exemplified by U.S. Pat. No. 3,983,535 to Herbst et al. and U.S. Pat. No. 4,128,829 to Herbst et al. make the concept of personal identification via computer based signature analysis practical. The invention disclosed in U.S. Pat. No. 3,983,535 is based on the discovery that the accelerations of the stylus, which are proportional to the muscle forces exerted by the signer, are of predetermined consistent durations when forming particular strokes in a habitual signature. The nature of the process gives rise to various distortions in the time axis; e.g., pauses between sections of the name, skipped strokes, decorative rubrics, and the like. Thus, the signal is marked by regions of high correlation of unknown duration separated by variable regions of low correlation. Accordingly, the invention in U.S. Pat. No. 3,983,535 dealt with a method of regional correlation which registered these regions based initially on stylus contact and then shifting the regions individually to find the maximal of the correlation function weighted to penalize shifting. The results were then combined to make an overall verification decision.

The signature verification method disclosed in U.S. Pat. No. 3,983,535 was based on a single acceleration parameter of a signature dynamic, but as disclosed in U.S. Pat. No. 4,128,829, an even greater discrimination in the verification operation is possible using two orthogonally disposed (e.g., x and y axes) acceleration components together with the pressure patterns which are produced during the writing of the signature and utilizing all three of these individual parameters in the correlation operation. The invention discloses in U.S. Pat. No. 4,128,829 retained the concept of segmenting the sample and utilizing a series of successive shifts to obtain the maximum possible correlation, weighting the correlations, and finally combining the individual correlation statistics for all segments. An example of a pen that may be used in the Herbst et al. verification system is disclosed in U.S. Pat. No. 4,142,175 to Herbst et al. This pen produces electrical signals proportional to accelerations in the x and y axes and an electrical signal proportional to the pen point pressure along the z axis.

It is to understood that the stylus described above contains apparatus which is specialized to the operation of a signature verification system. The accelerometers provide a data stream from which relative changes (not absolute changes as with a digitizer) in position may be derived. Since the pressure gauge must be able to assume several states to allow detection of several pressure levels, its travel can not be arbitrarily small. Hence, it is a less than perfect emulation of a writing instrument.

The data stream produced by an electronic stylus used for the purpose of handwriting input to a computer should not be distorted by user hand fatigue or other effects introduced by the stylus ergonomics. While writing instruments, such as pens and pencils, have mechanical properties to which their users become accustomed, these properties are not easily replicate in an electronic stylus. The act of writing involves a complex collection of both guided and reflexive actions which can be disrupted by substantive change in the properties of the stylus. The weight, thickness, drag, shape, and other gross mechanical properties of a writing instrument can also influence the fatigue generated by the act of writing. Fatigue can in turn introduce its own form of distortion into the user's writing.

In an environment in which a computing system is used to interpret handwritten characters and gestures, regularity in the produced handwriting is needed to keep the recognition algorithm simple and to keep recognition error to a minimum. Fatigue and the need for increased mental effort on the part of an electronic stylus user mitigates against this regularity and should be minimized. To the extent that it is possible, this objective can be achieved by the designing of an electronic stylus to imitate the mechanical properties of the conventional mechanical stylus.

Three properties of pens' and pencils' "activation" must be imitated by an electronic stylus to provide its user with a similar experience. A pen or pencil need not be pressed forcefully into paper to cause marking to begin. The point of such a stylus is not displaced axially to cause writing to begin. The point of such a stylus is resistant to being displaced axially. Conventional electro-mechanical switches provide a very poor fit to the problem of sensing electronic stylus contact while imitating conventional stylus properties. Switches which are used in common electronic styli can be characterized as having significant "pre-travel", "differential-travel", and "post-travel", as well as having activation force requirements. Pre-travel is the distance that a switch actuator must be pushed before there is any chance it will "close". Differential-travel is the distance over which switch closure is uncertain. Post-travel is the distance a switch actuator travels after switch closure has been achieved. Pre-travel, differential-travel, and post-travel are inconsistent with the zero-axial-travel requirements for imitating conventional writing instruments such as pens and pencils. Activation pressures higher than used in writing are inconsistent with the low-force requirement.

Many of the alternatives to electro-mechanical switches share their drawbacks or introduce new ones. Switches employing strain gauges, for example, must use substantial electronic systems to produce a switch simulation with no hysteresis. These electronic systems may require individual adjustment to compensate for differences between individual strain gauges.

U.S. Pat. No. 4,695,680 to Kable discloses a pen-down sense switch which utilizes a Hall effect sensor and a pair of permanent magnets to implement a switch. The magnets are arranged within the stylus so that they produce a magnetic field with a large gradient, and so they are moved by the retraction of the stylus point caused by the stylus body being pushed toward the tablet. Movement of the magnets causes the magnetic field intensity to change in the Hall sensor, which switches state when the magnetic field intensity change is sufficient to indicate the pen condition (up or down).

U.S. Pat. No. 4,034,155 to Muller et al. discloses a pen-down sense switch which utilizes the retraction of the stylus point to move a barrier into the optical path between a light source and a light detector. The barrier must travel in order to arrive at the critical point in the light path so switching does not take place at the start of travel and cannot be arbitrarily small. In general, electro-optical-mechanical switches have fundamentally the same properties as electro-mechanical switches.

Also known in the prior art are U.S. Pat. No. 4,848,496 to Murakami et al. and U.S. Pat. No. 4,786,765 to Yamanami et al. In U.S. Pat. No. 4,848,496, no switch technology per se is taught; rather, this patent discloses a method for determining the open a or closed state of a switch through its measurable effects on a tuned circuit. In U.S. Pat. No. 4,786,765, pen down detection is performed either by means of external sensing of the effects of switch state on the externally measurable behavior of a tuned circuit or by mechanically coupling the stylus point to either a resistance, capacitance or inductance element of the externally measured tuned circuit. This mechanical coupling will affect a change in tuning of the resonant circuit which, on passing some threshold value, will be encoded by the detecting circuitry as a pen up or down state.

In all of these prior art stylus designs, the stylus point is required to travel some distance before a change of state can be reliably detected; i.e., there is no reliably detectable change of state at the start of travel. Some digitizing technologies provide an intrinsic pen down sense as in the case of conductive sheet digitizers, but these may not be the digitizers of choice for a given design. Further, such digitization techniques may be inaccurate at very low stylus pressures and so may be usefully supplemented by a suitable stylus switch.

SUMMARY OF THE INVENTION

It is therefore an object of the present invention to provide an electronic stylus switch having an activation force in the range of writing instruments.

It is another object of the invention to provide an electronic stylus switch which imitates the properties of writing instruments yet requires simple interface electronics.

It is a further, more specific object of the invention to provide a pen-down-sensing switch for an electronic stylus which exhibits zero pre-travel, zero differential travel, and as arbitrarily close to zero post-travel as desired.

According to the invention, the pen-down sense switch is based on three geometric principles. The first is that surfaces such as plates, cones and spheres contact any surface possessing a larger (or a relative negative) radius of curvature at a single point. The second principle is that rigid bodies may be translated (within limits) without changing their size or shape. The third is that given a surface with a constant radius of curvature, three points which can contact its surface will uniquely determine its position. Within the physical environment and subject to the forces which typically act on stylus switches, solid metal components can be made to be a better than first-order approximation to ideal geometric objects.

In its preferred implementation, the pen-down sensing switch is composed of a metal sphere supported by three rigidly mounted but mutually insulated cylindrical metal posts. The proximal end of the stylus point shaft is brought into contact with the sphere at a point between and equidistant from the metal posts. A spring supports the stylus shaft so that contact is made with the sphere but the force needed to displace the sphere is not provided. This is possible because a second, opposed spring on the same axis provides a force which keeps the sphere seated on the posts. Ideally, this seating force should be applied at a point opposite the stylus shaft point of contact, but this is not absolutely necessary. If a pressure is applied to the stylus distal end (i.e., the "point" of the writing instrument), force is transmitted up its shaft to its proximal end contact with the sphere. When that force exceeds the seating force on the sphere (i.e., its weight plus the seating spring force), the sphere is displaced so that its contact with at least one post is lost. An electronic circuit detects this loss of contact and converts it to an appropriate form to indicate the pen-down condition. In a practical implementation, the seating force must be large enough that momentum imparted to the sphere by random movements of the user's hand will not be large enough to displace the sphere. In fact, since the mass of the sphere is proportional to the third power of its radius, this switch geometry can be built with very low activation force requirements.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
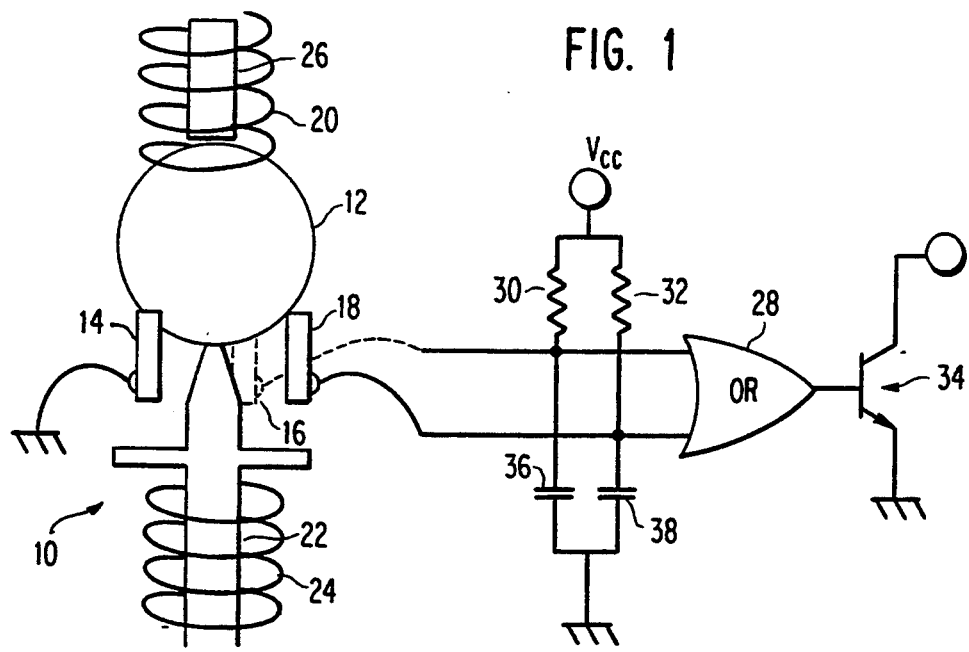
FIG. 1 is schematic diagram of the principle components of the pen-down switch according to the preferred embodiment of the invention.

Referring now to the drawings, and more particularly to FIG. 1, there are shown the principle components of the pen-down switch 10 according to the invention. These include a spherical contact ball 12 which is normally seated on three rigid metallic contact posts 14, 16 and 18 by a return spring 20. These contact posts are electrically insulated from one another except for electrical contact via the contact ball 12. A stylus shaft 22 abuts the contact ball 12 opposite the return spring 20 and is biased in a direction opposite the point of contact by a stylus seating spring 24. When pressure is applied to the stylus point, the stylus shaft 22 acts on the contact ball against the bias of return spring 20; however, the movement of the contact ball 12 is limited by a fixed post-travel limit stop 26. The distance between the post-travel limit stop 26 and the contact ball 12 can be made arbitrarily small.

Contact post 14 is electrically grounded. The contact posts 16 and 18 are connected to respective inputs of a two input OR gate 28. Pull-up resistors 30 and 32 are connected to each of these inputs and to a common source of positive voltage $V_{cc}$. The output of OR gate 28 is connected to the base of an NPN bipolar transistor 34, the emitter of which is electrically grounded. With no pressure on the stylus, both inputs to the OR gate 28 are logical zero as represented by electrical ground since the contact ball 12 makes contact with all three contact posts 14, 16 and 18 under pressure of the return spring 20. With pressure on the stylus, the stylus shaft 22 causes the contact ball 12 to break contact with one or more of the contact posts 14, 16 or 18. This in turn causes one or the other of the inputs to the OR gate to go to logical one as represented by the voltage $V_{cc}$. A positive voltage is therefore applied to the base of transistor 34 causing it to conduct. When the transistor 34 conducts, its collector is pulled to electrical ground thus providing a logical zero output for the switch.

The switch exhibits zero pre-travel and zero differential-travel. Since the contact sphere 12 cannot deform, it must be supported either by the three contact posts 14, 16 and 18 or by at most two of those posts and the distal end of the stylus shaft 22. The change between these mechanical states must happen when the force on the stylus passes the support threshold and can not happen before that time. Contact with at least one post is lost at the instant of displacement, hence at the start of stylus travel. Since any stylus travel is sufficient to activate the switch, the post-travel can be made arbitrarily small by adjustment of the post-travel limit stop 26.

Figure 2A:
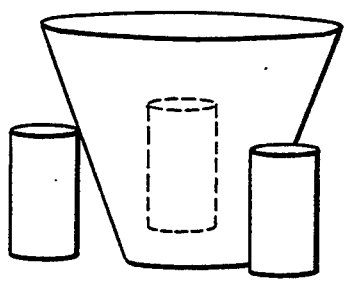
FIGS. 2A and 2B are pictorial diagrams showing examples of other shapes which may be substituted for the metal sphere/cylindrical post arrangement used in the switch shown in FIG. 1.
Figure 2B:
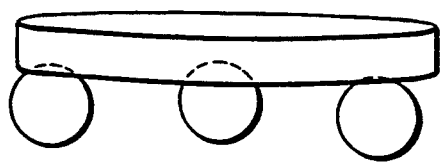

The preferred embodiment uses a spherical contact ball 12, but this geometric shape is but one shape that could be used. For example, a linear surface of revolution, such as the cone shown in FIG. 2A could be used. Similarly, a flat disk resting on three spherical "posts", as shown in FIG. 2B, meets the design specification of this switch. As a practical matter, however, the shape should be kept simple for economies of manufacturing.

Figure 3:
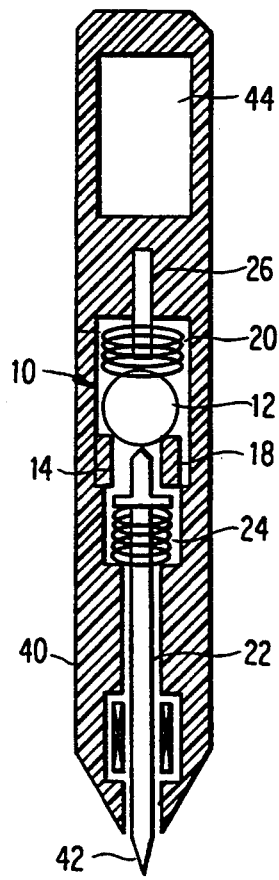
FIG. 3 is a simplified cross-sectional view showing the placement of the switch within the body of a stylus for an electromagnetic digitizer.

The inherent compact design of the stylus switch permits its incorporation in a stylus of a shape and size that approximates a pen or pencil, as illustrated in FIG. 3. The switch 10 is housed in a cavity of the stylus body 40 intermediate the point 42 at one end of the stylus and a second cavity 44 at the other end of the stylus. The point 42 may be provided with a ball (not shown) to simulate the feel and movement of a ball point pen. The second cavity 44 houses the electronics.

Referring back to FIG. 1, switches depend for their properties on factors other than their actuation mechanism. The contact materials used play a substantial role in the time dependent behavior of a switch. The working environment of a switch also affects its operation. In order to avoid failures due to ambient induced surface oxidation of the contact sphere 12, small capacitors 36 and 38 are connected between the pull-up resistors 30 and 32, respectively, and electrical ground. The discharges of these capacitors serves to clean the contact surface. Care must be taken in the choice of the capacitor size to prevent pitting. In practice, one kilo-Ohm pull-up resistors and one micro-Farad capacitors do not appear to cause damage and do not interfere with pen-down sense timing. Care must also be exercised in the choice of switch and pen body materials to prevent differential expansion from induced warming from affecting switch operation.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A pen-down sensing switch for electronic styli comprising:

a metal contact supported by three rigidly mounted but mutually insulated metal posts;

a stylus shaft having a proximal end and a distal end, said proximal end being in contact with said metal contact at a point between and equidistant from said metal posts;

a spring contacting said metal contact and providing a force which keeps said metal contact seated on said metal posts;

an OR gate having two inputs, said two inputs being connected to respective ones of two of said three metal posts, the third metal post being connected to a first voltage reference; and first and second resistors connected to respective ones of said two inputs and to a second voltage reference, wherein when a pressure is applied to said distal end of said stylus shaft and a sufficient force is transmitted up said stylus shaft to its proximal end in contact with said metal contact, said metal contact is displaced and its contact with at least one of said metal posts is lost and this loss of contact is detected by said OR gate and converted to indicate a pen-down condition.

2. The pen-down sensing switch recited in claim 1 wherein said electronic circuit further comprises a transistor connected to be biased into conduction when electrical contact between said metal contact and one of said metal posts is broken.

3. The pen-down sensing switch recited in claim 1 wherein said electronic circuit further comprises first and second capacitors connected to respective ones of said two inputs and to said first voltage reference, electric discharges from said first and second capacitors when electrical contact is broken and remade between said metal contact and said two of said metal posts serving to keep said metal contact free of oxidation.

4. A handwriting stylus for use in a computer interface comprising:
- a stylus body having a first end and a second end, said stylus body having first and second cavities, said first cavity being located near said first end and said second cavity being located intermediate said first and second ends, said stylus body further having a bore extending from said second end to said second cavity;
- a stylus shaft in said bore and having a first end extending into said second cavity and a second end extending beyond said second end of said stylus body;
- a pen-down sensing switch within said second cavity including a metal contact supported by three rigidly mounted but mutually insulated metal posts, said stylus shaft being in contact with said metal contact at a point between and equidistant from said metal posts, and a spring contacting said metal contact and providing a force which keeps said metal contact seated on said metal posts;
- an OR gate having two inputs, said two inputs being connected to respective ones of two of said three metal posts, the third metal post being connected to a first voltage reference; and
- first and second resistors connected to respective ones of said two inputs and to a second voltage reference, wherein when a pressure is applied to said second end of said stylus and a sufficient force is transmitted up said stylus to its first end in contact with said metal contact, said metal contact is displaced and its contact with at least one of said metal posts is lost and this loss of contact is detected by said OR gate and converted to indicate a pen-down condition.

5. The stylus recited in claim 4 wherein said electronic circuit further comprises a transistor connected to be biased into conduction when electrical contact between said metal contact and one of said metal posts is broken.

* * * * *